United States Patent
Picard et al.

(10) Patent No.: US 12,392,012 B2
(45) Date of Patent: Aug. 19, 2025

(54) METHOD FOR RECOVERING METALS CONTAINED IN SPENT CATALYSTS FROM FERRO-ALLOYS

(71) Applicants: EURECAT S.A., La Voulte-sur-Rhône (FR); ECO'RING, Chambeon (FR)

(72) Inventors: Lionel Picard, Feurs (FR); Jean-Luc Roth, Metz (FR)

(73) Assignees: EURECAT S.A., La Voulte-sur-Rhône (FR); ECO'RING, Chambeon (FR)

(*) Notice: Subject to any disclaimer, the term of this patent is extended or adjusted under 35 U.S.C. 154(b) by 542 days.

(21) Appl. No.: 17/912,153

(22) PCT Filed: Mar. 17, 2020

(86) PCT No.: PCT/FR2020/000060
§ 371 (c)(1),
(2) Date: Sep. 16, 2022

(87) PCT Pub. No.: WO2021/186113
PCT Pub. Date: Sep. 23, 2021

(65) Prior Publication Data
US 2023/0132701 A1 May 4, 2023

(51) Int. Cl.
*C22B 7/00* (2006.01)
*C22B 5/08* (2006.01)
(Continued)

(52) U.S. Cl.
CPC ............ *C22B 7/009* (2013.01); *C22B 5/08* (2013.01); *C22B 7/04* (2013.01); *C22B 9/05* (2013.01); *C22B 9/10* (2013.01)

(58) Field of Classification Search
CPC .. C22B 7/009; C22B 5/08; C22B 7/04; C22B 9/05; C22B 9/10
See application file for complete search history.

(56) References Cited

U.S. PATENT DOCUMENTS

2010/0126309 A1* 5/2010 Roth .................... C22B 23/026
75/10.39
2019/0330720 A1 10/2019 Albrecht et al.

FOREIGN PATENT DOCUMENTS

| EP | 1983066 A1 | 10/2008 |
| JP | 2002235123 A | 8/2002 |
| WO | WO2008119695 A1 | 3/2008 |

OTHER PUBLICATIONS

International Search Report Dated Oct. 23, 2020.
(Continued)

*Primary Examiner* — Ricardo D Morales
(74) *Attorney, Agent, or Firm* — Boyle Fredrickson S.C.

(57) ABSTRACT

The invention includes a method for treating a spent catalyst containing at least one refractory mineral oxide, one or more metals in the form of sulfide(s) chosen from the following metals: molybdenum, nickel, cobalt, tungsten, vanadium, and carbon compounds, the method comprising:
a) in a smelting furnace preparing a melt of cast iron with a layer of slag;
b) introducing into the furnace said spent catalyst and placing it in contact with the slag and the melt of cast iron, while maintaining the furnace in rotation and while injecting an oxidizing gas containing oxygen, above the mixture, to cause the combustion of the carbon and/or sulfur compounds;
c) extracting from the furnace by sequential castings the slag formed in step b) to recover a cast iron melt enriched with metal or metals, and recover a slag containing the components of the catalyst other than metals, with the exception of vanadium.

20 Claims, 2 Drawing Sheets

Figure 1:
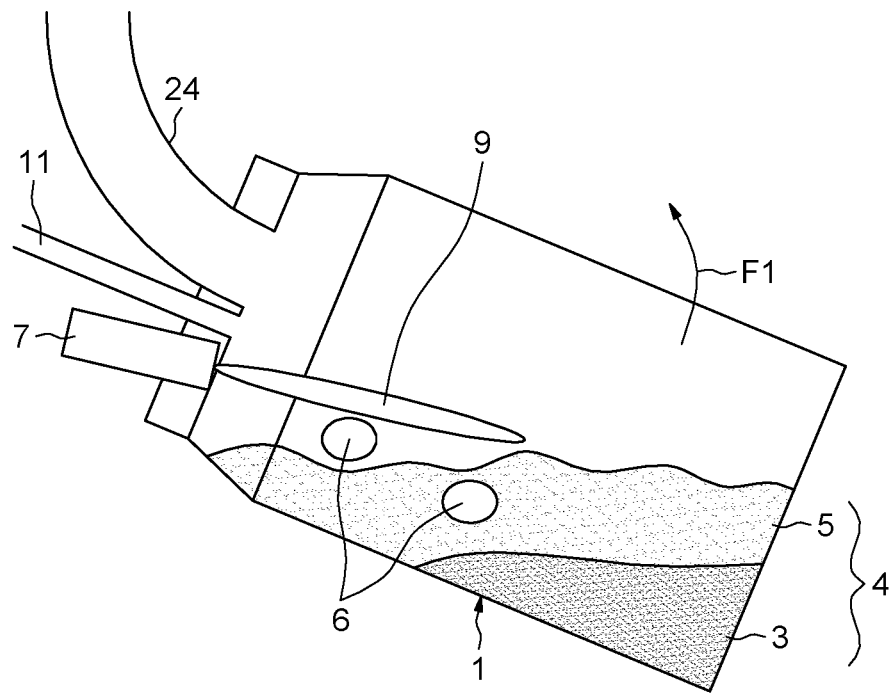

(51) Int. Cl.
  *C22B 7/04*   (2006.01)
  *C22B 9/05*   (2006.01)
  *C22B 9/10*   (2006.01)

(56) References Cited

OTHER PUBLICATIONS

Written Opinion Dated Oct. 23, 2020.
Pankartz E. Aufarbeitung Von Verbrauchten Ni-Fettkatalysatoren Reference pp. 487-490.
Rakitin D I et al. Founding of chrome-nickel master alloys from spent nickel alumina containing catalyzer and waste of ferroalloy production Reference pp. 29-31.
International Preliminary Report on Patentability.

* cited by examiner

METHOD FOR RECOVERING METALS CONTAINED IN SPENT CATALYSTS FROM FERRO-ALLOYS

The present invention relates to a method which allows to recycle the metals contained in the spent catalysts coming from the methods for treating hydrocarbons carried out in the fields of petroleum refining and petrochemistry, by recovering them in ferro-alloys.

PRIOR ART

The methods for treating hydrocarbons carried out in refineries and/or petrochemical units include a certain number of treatments carried out in the presence of catalysts containing metal compounds. Non-limiting examples include the methods of hydrocracking, reforming, hydrogenation, and the "hydrotreating" methods such as the methods of hydrodesulfurization, hydrodenitrogenation, hydrodearomatization, hydrodemetallization.

The catalysts used in these methods are in the form of solid particles comprising a porous support containing one or more refractory inorganic oxides, such as alumina, on which one or more catalytically active metals are deposited, comprising at least one metal from group VIII of the periodic table of the elements such as nickel and/or cobalt, generally associated with one or more metals from group VIB such as molybdenum.

During their use, these catalysts are progressively deactivated, in particular because of the deposition on their surface of coke, that is to say of a mixture of heavy hydrocarbons, of carbon residues, of metal impurities contained in the treated feedstock such as in particular compounds of vanadium.

After their cycle of use, these catalysts can be recycled by a "regeneration" treatment during which the coke is eliminated by combustion, and which aims to confer on the catalyst a level of activity as close as possible to its initial level.

However, after one or more cycles of use and of recycling, the spent catalysts are no longer capable of being regenerated in a technically and economically satisfactory manner.

For reasons of economy and preservation of the environment, reusing these spent catalysts at end of life is now sought more and more.

In the spent catalysts, the metals are substantially in the form of metal sulfides with concentrations of hydrocarbon, sulfur and carbon that can go, for each, up to 20% by weight of the catalyst.

Mainly three states are distinguished for the spent catalysts:

Spent catalyst in the raw state: these catalysts have not undergone any treatment, and contain the metals in the form of sulfides as well as sulfur and carbon compounds substantially in the form of fixed carbon and hydrocarbons at concentrations that can go up to 20% by weight each;

Spent catalyst in the deoiled state: these catalysts have undergone an almost total extraction of the hydrocarbons, typically under the action of the temperature and of a flow of gas, which can be nitrogen, water vapor and, under certain conditions of moderate temperature, air. They contain the metals in the form of sulfides as well as sulfur and carbon in the form of fixed carbon at concentrations that can go up to 20% by weight each, and a residual of hydrocarbons at a concentration that can go up to 5% by weight;

Spent catalyst in the calcined or "grilled" state: these catalysts have undergone a calcination treatment, they contain the metals substantially in the form of oxides, their concentration of sulfur and of carbon compounds is less than 3% each, their concentration of hydrocarbons being zero.

In the present application, "carbon compounds" means all the compounds containing carbon, whether they are of an organic or inorganic nature. This term combines hydrocarbons and fixed carbon.

"Fixed carbon" means all the compounds containing carbon that are different from the hydrocarbons. This term corresponds to that which is designated in a manner known per se by the name "coke".

Table 1 below presents, as a non-limiting example, typical chemical compositions for "NiMo" or "CoMo" or "NiCoMo" or "NiMoV" catalysts on an alumina support in the raw, deoiled and grilled states. In this table, all the concentrations are expressed in percentage by weight relative to the total of the raw, deoiled or grilled catalyst, respectively, with the exception of the concentrations of nickel, cobalt, molybdenum and vanadium which are expressed in percentage by weight relative to the total of the grilled catalyst (concentration of metal in the state of oxide, on the catalyst without hydrocarbons, the concentration of carbon of which is less than 3% by weight and the concentration of sulfur of which is less than 3% by weight).

TABLE 1

| State | Raw | Deoiled | Grilled |
| --- | --- | --- | --- |
| Hydrocarbons | Up to 20% | Up to 5% | 0 |
| Sulfur | Up to 20% | Up to 20% | Up to 3% |
| Fixed carbon | Up to 20% | Up to 20% | Up to 3% |
| $Al_2O_3$ Alumina | Up to 40% | Up to 50% | Up to 60% |
| Other oxides ($SiO_2$, $FeO_x$, . . .) | Up to 3% | Up to 4% | Up to 5% |
| Nickel | 2 to 5% | 2 to 5% | 2 to 5% |
| Cobalt | 2 to 5% | 2 to 5% | 2 to 5% |
| Molybdenum | 5 to 20% | 5 to 20% | 5 to 20% |
| Vanadium | 0 to 20% | 0 to 20% | 0 to 20% |

Conventionally, the raw spent catalysts are deoiled before any later treatment.

Also conventionally, the various existing recycling sectors, hydrometallurgical or pyrometallurgical, all operate an operation of grilling by calcination that aims at transforming the metal sulfides into oxides and at eliminating the carbon which is bothersome for operating the hydrometallurgical sectors.

This results in a waste of the energy contained in the hydrocarbons.

The molybdenum, the vanadium and sometimes also the nickel and/or the cobalt are most often separated and purified after grilling, by a succession of hydrometallurgical steps, with leaching and selective precipitation of certain elements. The main disadvantage of this hydrometallurgical sector is its succession of numerous and complex steps up to the finished products, which involves significant consumptions of energy and of reactants in particular of chemical products, and strong environmental impacts in terms of production waste and emissions of $CO_2$, with significant associated costs. Moreover, the yields of recovery of the metals such as nickel, cobalt, molybdenum, vanadium (Ni, Co, Mo, V) are relatively low.

A less widespread sector, but applied in particular in Europe, involves following the grilling with melting in an electric furnace of the submerged arc electric furnace type or of the free arc electric furnace (EAF) type—one alternative of which is the direct current electric furnace—then carrying out, in a separate step, the refining of the ferro-alloy obtained in particular by elimination of the sulfur and of the phosphorus in another reactor, then optionally the conversion of the scorified vanadium into ferro-vanadium by Silico-Aluminothermy.

In this method also the consumptions of energy are particularly significant. The succession of steps and of reactors leads to high electricity consumptions.

Moreover, in the case of the catalysts containing vanadium in a notable proportion (for example greater than 5% by weight), the latter is transferred for the very most part into the slag and solidified. This slag is then treated in a hydrometallurgical or pyrometallurgical step to extract the vanadium therefrom.

The patent EP 1 983 066 presents a method allowing to directly process in an electric furnace deoiled catalysts (without previous grilling), by feeding and treating these catalysts on a melt of cast iron (carbide iron at 2-4% C), stirred by injection of neutral gas, and with addition of lime allowing to obtain a fluid slag. This melting into a ferro-alloy is followed by the subsequent application in the same furnace of treatments of optional complementary desulfurization (with lime), then of dephosphorization of the ferro-alloy (dephosphorization by injection of oxygen and addition of lime and of iron oxide), allowing to lower the sulfur and phosphorus concentrations thereof to less than 0.1%.

However, this method has several disadvantages.

On the one hand, the carbon compounds present in the raw catalysts, including both fixed carbon and carbon in the form of hydrocarbons, are practically not used. Only the fixed carbon is partly used in the reduction reactions, for example of the type: $NiO+C \rightarrow Ni+CO$. However, the significant energy content of the CO gas, the sulfur and all of the hydrocarbons present in the raw catalysts is wasted.

On the other hand, the treatments of complementary desulfurization and of dephosphorization of the ferro-alloy are carried out in an electric furnace, the performance of which is limited by the geometry of the technology, in particular flat and static melt, which results in a limitation of the exchanges between the melt of cast iron and the slag, despite the application of stirring by gas. It follows therefrom that these treatments are costly in time, stirring gas and complementary addition of energy to maintain the temperature of the metal melt and of the slag. Moreover, for these same reasons of geometry of technology, the formation of slag in significant proportions (more than 1 tonne of slag per tonne of treated catalyst) requires carrying out a frequent elimination (or "slagging off") of the slag, which leads to a loss of time and of productivity, because of the regular interruption of the method.

Finally, when the catalysts contain vanadium, the latter is transferred to the slag, which is in the case of this method slagged off in small quantities, and which must be treated separately to extract the vanadium therefrom. This treatment of the vanadium present in the slag is thus carried out after cooling of the slag, which requires new spending of energy (electricity+electrodes) to remelt it before extracting the vanadium therefrom by a pyrometallurgical method of the silico-aluminothermy type.

OBJECT OF THE INVENTION

The present invention aims to propose a new method allowing an efficient recovery of the metals present in spent catalysts, such as molybdenum, nickel, cobalt and optionally vanadium, while being less costly and in particular while requiring less energy consumption with respect to the existing methods.

The applicant has developed a method for recovering these metals from the spent catalysts, which is characterized in that it is implemented in a melting reactor of the rotary converter type containing a melt of liquid cast iron and in the presence of a targeted injection of oxygenated gas. This type of reactor is capable of carrying out via its rotation a more energetic stirring than a static furnace with a flat melt, and of containing greater quantities of slag than an electric furnace having the same capacity.

The method according to the invention allows to efficiently recover the metals of value such as molybdenum, nickel, cobalt, tungsten, which are transferred into the cast iron. When the spent catalyst contains vanadium, the method of the invention allows to manage large quantities of slag rich in vanadium, this slag thus being capable of being treated "hot", that is to say without requiring a specific heating step, in particular by directly transferring the slag into another rotary reactor.

The method according to the invention has the important advantage of using the energy contained in the carbon compounds, in particular the hydrocarbons and the fixed carbon, and the sulfur present in the raw catalysts and the deoiled catalysts to a greater or lesser degree.

The object of the present invention is therefore a method for treating a spent catalyst containing at least one refractory mineral oxide, one or more metal(s) in the form of sulfide(s) chosen from the following metals: molybdenum, nickel, cobalt, tungsten, vanadium and carbon compounds. This method comprises the following successive steps:

a) in a smelting furnace of the rotary converter type, preparing a melt of cast iron in the melted state above which there is a layer of slag; then b) introducing into the furnace said spent catalyst and placing it in contact with the slag and the melt of cast iron in the melted state, while maintaining the furnace in rotation and while injecting an oxidizing gas containing oxygen into the furnace, above the mixture of catalyst, slag and cast iron, in such a way as to cause the combustion of the carbon and/or sulfur compounds which are released from the catalyst in contact with the slag and the liquid cast iron; then c) extracting from the furnace by sequential casting the slag formed in step b) in such a way as to on the one hand recover in the furnace a cast iron melt enriched with metal or metals, and on the other hand recover a slag containing the components of the catalyst other than metals, with the exception of vanadium which, when the spent catalyst contains vanadium, ends up in the slag.

The method according to the invention thus allows to reuse the metals contained in the catalysts, by transferring them and by separating them in an efficient manner either in a cast iron melt for the metals molybdenum, nickel, cobalt, tungsten, or in the slag for vanadium, while using the energy contained in the spent catalysts, namely the carbon compounds (in the form of fixed carbon and hydrocarbons), and the sulfur.

In particular, during the highly endothermic phase of the melting of the spent catalyst in step b), the carbon compounds, the hydrocarbons and the metal sulfides are for the most part transformed into volatile sulfides of the SOx type and into $CO_2$ in the presence of the injected oxygenated gas, which reuses their energy by heating the contents of the furnace and by allowing to maintain its temperature at the required level.

The technology of the rotary converter has turned out to be particularly adapted to carrying out such a thermally efficient combustion, contrary to the static electric furnace. Indeed, besides the advantageous geometry of the converter, its rotation allows to retransfer to the melt of cast iron and of slag the heat transmitted by the combustion via the refractory wall of the furnace.

Typically, one tonne of raw catalyst containing 10% by weight of fixed carbon and 10% by weight of hydrocarbons has an energy content of approximately 2000 kWh (thermal), due to the total combustion into $CO_2$ and $H_2O$ (cold exiting flue gases). In the conventional technologies, this energy is lost. For one tonne of raw catalyst containing 20% by weight of fixed carbon and 20% by weight of hydrocarbons, this energy content can go up to approximately 4000 kWh. In the case of electric melting of the catalyst, the energy necessary for the melting is approximately 1000 to 1500 kWh (electric) per tonne of catalyst. Thus, not only the energy contained in the catalysts in the form of fixed carbon, hydrocarbons and sulfur is lost, but also it is necessary to add a significant consumption of electric energy to carry out the melting.

Thus, the energy balance of the method according to the invention with respect to the existing technologies is particularly advantageous because of the efficient use of the carbon, of the hydrocarbons, and of the sulfur as fuels. Indeed, in the conventional technologies these elements are eliminated either before the treatment (hydrometallurgical or pyrometallurgical) or in a supplemental treatment of flue gases in a separate post-combustion chamber and their energy is wasted. Moreover, this supplemental treatment of flue gases in a post-combustion chamber requires the implementation of means for cooling the flue gases after post-combustion, thus additional consumptions of natural gas (for the post-combustion) and of electricity (for the cooling), with excessive volumes of flue gasses to be treated, significant consumptions of reactants of desulfurization of the flue gases via the dilution of the flue gases and their neutralization yield, which also leads to consumptions of gas, of electricity, waste to be eliminated and transported.

Moreover, the technology of the rotary converter allowing to easily turn the reactor upside down, the phases of casting of the slag and of the metal are easier and more secure compared to the technologies with plugging-unplugging of the metal-slag casting holes of the electric furnaces used in the prior art.

Other objects, features, aspects and advantages of the invention will appear even more clearly upon reading the following description and examples, as well as the appended drawings.

Figure 2:
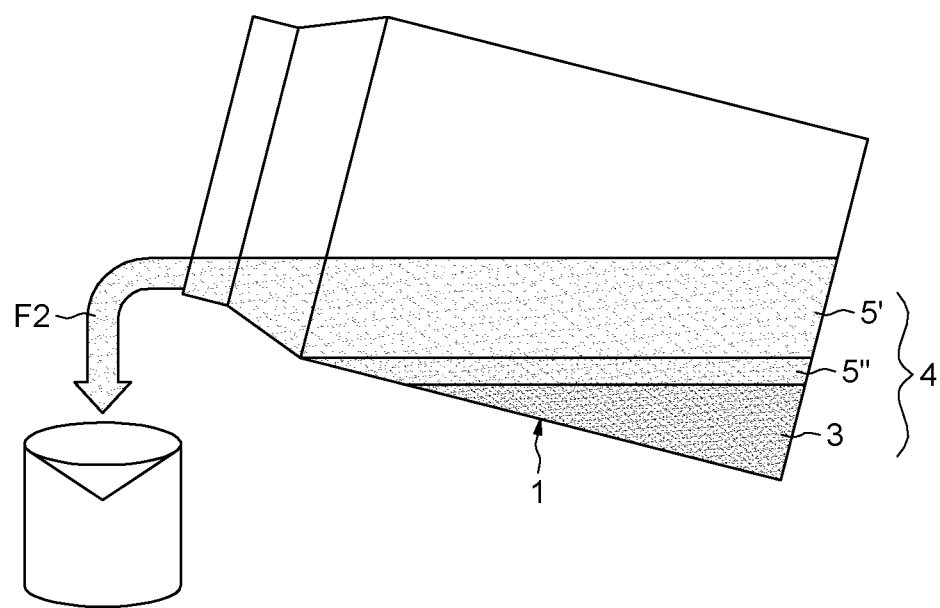

FIGS. 1 and 2 schematically illustrate the implementation of steps b) and c) of the method according to the present invention.

Figure 3:
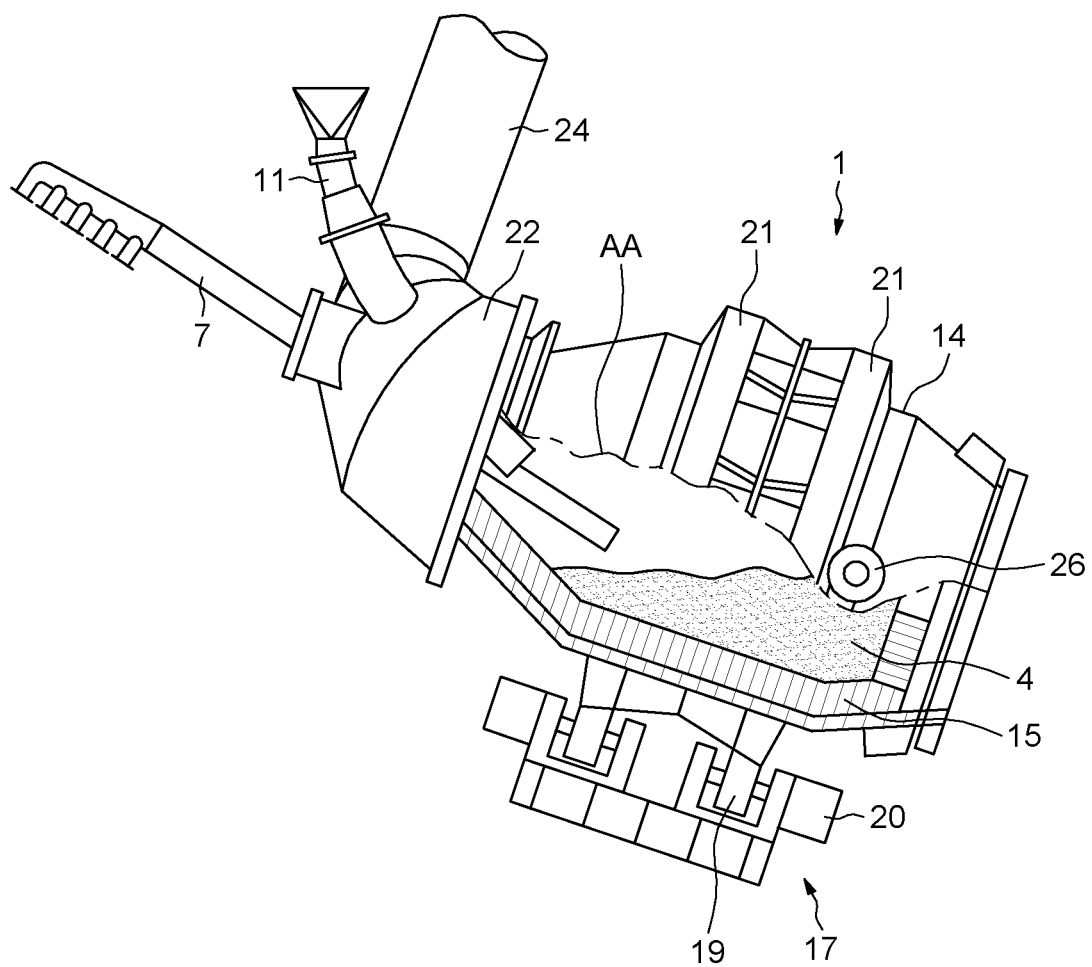

FIG. 3 shows an example of a smelting furnace of the rotary converter type suitable for the implementation of the invention.

Below, and unless otherwise indicated, the limits of a range of values are included in this range, in particular in the expressions "between" and "ranging from . . . to . . . ".

Moreover, the expressions "at least one" and "at least" used in the present description are respectively equivalent to the expressions "one or more" and "greater than or equal to equal".

DETAILED DESCRIPTION

The method according to the invention comprises a first step a) which involves preparing a melt of cast iron in the melted state above which there is a layer of slag, in a smelting furnace of the rotary converter type.

It is possible to heat in the furnace a feedstock of granules of cast iron and/or cast iron ingots, of ferro-alloy and/or metal scraps of cast iron and/or of steel, in such a way as to melt them.

A preferred embodiment involves starting from a melt of cast iron having a composition as close as possible to that which would result from the treatment of the feedstock of spent catalyst introduced in step b). Indeed, it is advantageous to treat a given type of catalyst in a campaign having a long duration (typically several days), which allows to manufacture over this duration a ferro-alloy having a stable composition.

The layer of slag can be obtained by adding into the furnace lime and alumina (for example the alumina of the catalysts) in a relative proportion, for example, respectively 40% and 60% by weight. This alumina-lime compound is renowned for having a low melting point and especially being extremely desulfurizing, that is to say that it will mineralize the sulfur rather than the latter leaving in the flue gases.

A rotary converter is a device known per se in the metallurgical field, which consists of a heated reactor, the inner walls of which are made of a refractory material in order to support very high temperatures, driven in rotation around its axis of symmetry via a motor.

The temperature to which the cast iron melt is heated in step a) is typically comprised in the range ranging from 1400° C. to 1650° C., and preferably from 1450° C. to 1550° C.

In a second step b) the spent catalyst is introduced into the converter maintained in rotation, in such a way as to place it in contact with the supernatant slag and the melt of cast iron in the melted state, which causes its melting.

According to a preferred embodiment, materials routinely called "flux" in metallurgy, which can be in particular chosen from lime, iron oxide, sodium carbonate, and calcium fluoride, are also introduced into the furnace during this step.

Simultaneously, a gas containing oxygen, called oxidizing gas, is injected continuously into the furnace, above the mixture of catalyst, of slag and of cast iron, which causes the combustion or the transformation of the carbon and/or sulfur compounds which are released from the catalyst while giving back their combustion energy.

The oxidizing gas can consist of oxygen, of air enriched with oxygen, or of a mixture of oxygen and of inert gas such as nitrogen. Preferably, the oxidizing gas has an oxygen concentration of at least 30% by weight.

To efficiently transform the hydrocarbons and the gas in particular of the type carbon monoxide (CO) and sulfurated gases which are released from the catalyst into energy, the injection of the oxidizing gas is advantageously carried out via one or more gas injector(s), the axis of which is substantially parallel to the melt of cast iron and of slag, and with a moderate injection pressure in such a way as to create a low-thrust jet (or "soft" jet) not penetrating the melt of metal and of slag, as opposed to the "hard" jets used elsewhere in metallurgy to penetrate into the metal-slag melt.

Indeed, the goal is not to inject the oxidizing gas into the melt of cast iron or of slag, but to create above the melt and the slag a source of heat by the combustion in particular of the hydrocarbons, of the fixed carbon, of the sulfur and of the carbon monoxide. This heat is transmitted to the feedstock of cast iron, of slag, of flux materials and of catalyst in a direct manner, and in an indirect manner via the refractory wall of the converter, via the rotation of the latter.

During step b), the temperature of the furnace is advantageously maintained in the range ranging from 1400° C. to 1650° C.

During step b), the slag present above the melt of cast iron is progressively enriched in components of the catalyst comprising in particular the refractory oxides (alumina, silica . . . ), a part of the sulfur, and the vanadium when the spent catalyst treated contains it. The "flux" materials optionally added also end up in the slag except for the iron oxide which is divided between the melt of cast iron in the form of iron and the slag.

The metals chosen from molybdenum, nickel, cobalt, tungsten present in the spent catalyst in the form of oxide are reduced in the presence of the carbon present in the spent catalyst, and pass into the melt of cast iron. For example, in the case of nickel, the reduction reaction is the following: $NiO+C \rightarrow Ni+CO$.

According to one embodiment, a hydrocarbon fuel gas is also injected into the furnace during step b). This fuel gas preferably comprises light hydrocarbons, such as hydrocarbons comprising from 1 to 4 carbon atoms. An example of a particularly preferred fuel gas is natural gas.

This fuel gas can be injected together with the oxidizing gas, that is to say via the same injector, or via a distinct injector.

This embodiment is advantageous when during step b) catalysts containing very little carbon are introduced, for example catalysts entirely or partly grilled. Indeed, the injection of hydrocarbon fuel gas allows to add a make-up of carbon compounds to promote the reactions of reduction of the metal oxides. It is also preferable in this case to implement an oxidizing gas containing higher oxygen concentrations.

Step b) is ended either when all the spent catalyst has been treated, or when the rotary converter is full and additional catalyst can no longer be fed into it given the necessary additions (for example of fluxes) if necessary.

After step b), the method comprises a step c) involving extracting the slag formed in step b) from the furnace by casting. The casting is carried out in a manner known per se, in a sequential manner.

This allows to recover in the furnace a melt of cast iron enriched in metal or metals extracted from the catalyst.

After the evacuation of the slag (step c), the sequence of the steps (b) then (c) can be repeated one or more times, in such a way that the cast iron melt contained in the furnace is once again enriched with metals, as many times as necessary until a cast iron having the desired concentration of metals is obtained. In this case, after step c), the step b) of introducing a spent catalyst is preferably directly carried out, preferably without intermediate cooling of the melt of cast iron.

Once the desired concentration of metal has been reached in the melt of cast iron, the method according to the invention can further comprise one or more steps of treatment or of refining of the melt of cast iron, preferably carried out in the rotary converter.

In particular, the method can further comprise one or more steps of desulfurization and of dephosphorization of the melt of cast iron so as to lower its concentrations of sulfur and of phosphorus typically to a value lower than 0.1% by weight.

These treatments can be carried out by adding into the rotary converter lime and/or a sodium bicarbonate-carbonate solution, containing iron oxide.

During these treatment operations, one or more operations of "slagging off", that is to say emptying, of the slag can be carried out, until the targeted concentrations of sulfur and of phosphorus are obtained.

After the optional treatment steps, the cast iron melt enriched with metal or metals is cast out of the furnace, for its solidification. It can then be marketed.

Moreover, the slag eliminated from the rotary converter in step c) is also recovered.

According to a first alternative, the slag is left to cool in such a way as to cause its solidification. It can then be directly reused for example in the form of calcium aluminate, in particular in the case in which the spent catalyst(s) from which it has come do not contain vanadium.

According to a second alternative, applicable in the case in which the spent catalyst(s) treated contain vanadium, the slag recovered in step c) can advantageously be transferred into a second furnace, in which it is treated to extract the vanadium therefrom. According to a preferred embodiment, this second furnace is also a rotary converter. The vanadium can be extracted by addition to the slag of aluminium and/or silicon in granules, which allows to recover on the one hand a slag devoid of vanadium and on the other hand ferrovanadium. The slag can thus then be reused for example in the form of calcium silico-aluminate.

The gases escaping from the rotary converter during step b) of the method according to the invention are treated in suitable devices, known per se.

According to a preferred embodiment, the method implements devices for treating the gases allowing low emission standards to be obtained.

In the context of the present invention, the devices for treating the gases can have lesser dimensions, in particular contain chambers for post-combustion of the gases, the size of which is reduced by at least 30% with respect to the devices of the prior art in an electric furnace, because of the efficient combustion in the rotary converter of the combustible compounds contained in the spent catalysts treated.

Moreover, the invention allows to significantly reduce the quantities of reactants used for the desulfurization of the gases (for example lime milk, a solution of sodium bicarbonate) because of better capture of the sulfur of at least 30% in the slag via the mechanical stirring induced by the rotation of the converter during step b).

The method according to the present invention allows to treat in an efficient manner any spent catalyst used in the treatment and/or the conversion of hydrocarbons in the fields of petroleum refining and petrochemistry.

These catalysts are generally in the form of solid particles having a small size such as balls, more or less cylindrical particles, extruded products.

These catalysts comprise a porous support generally consisting of one or more refractory inorganic oxides on which one or more catalytically active metals are deposited, which can be chosen from the metals of the groups VB, VIB, IB, VIII and VIB of the periodic table of the elements.

The support of these catalysts is formed by one or more refractory mineral oxides such as in particular the aluminas, the silicas, the silica-aluminas, the zeolites, the zirconias, the oxides of titanium and of boron, and the mixtures of such oxides.

In particular, the method according to the invention is particularly suitable for the treatment of spent catalysts containing at least one of the following metal associations: CoMo, NiMo, NiCoMo, NiMoV, NiW, NiMoWCo, FeCeMoK.

These catalysts can also contain in the spent state vanadium, coming from a contamination by the feedstocks of hydrocarbons treated during the cycles of use of the catalyst.

As described above, in particular when they are treated in the raw or deoiled state, these catalysts further contain carbon compounds, which can be in particular in the form of hydrocarbons and of fixed carbon, as well as sulfur inter alia in the form of metal sulfides.

According to a preferred embodiment, the spent catalyst introduced in step b) is in the raw state, that is to say that it has not undergone any previous treatment.

Such a catalyst contains the metals in the form of sulfides as well as hydrocarbons, sulfur and fixed carbon. Its concentration of hydrocarbons is preferably comprised in the range ranging from 5% to 20% by weight, relative to the total weight of the spent catalyst, preferably 10 to 20% by weight.

According to a second embodiment, the spent catalyst introduced in step b) is in the deoiled state, that is to say that it has undergone previous washing under the action of the temperature and of a flow of gas, which can be nitrogen, water vapor and air.

Such a catalyst contains the metals in the form of sulfides as well as hydrocarbons, sulfur and fixed carbon. Its concentration of hydrocarbons is preferably comprised in the range ranging from 0.1% to 5% by weight, relative to the total weight of the spent catalyst.

Regardless of the embodiment, the spent catalyst contains fixed carbon at a concentration preferably comprised in the range ranging from 5% to 20% by weight, relative to the weight of the spent catalyst, preferably 10 to 20% by weight.

FIG. 1 schematically illustrates the implementation of step b).

This figure shows a furnace 1 of the rotary converter type, maintained in rotation as illustrated by the arrow F1.

This furnace contains a mixture 4 formed by a melt of cast iron in the melted state 3 above which there is a layer of slag 5 coming from the melting of the spent catalyst treated with "fluxes".

An injector 7 injects into the furnace above the mixture 4 an oxygenated oxidizing gas so as to cause the combustion 9 of the carbon and/or sulfur compounds which are released from the catalyst in contact with the slag and the liquid cast iron represented by the bubbles 6.

This injector can be for example a burner known by the name "Oxygaz", supplied with oxygenated oxidizing gas and optionally with hydrocarbon fuel gas according to the quantity of carbon and of hydrocarbon provided by the catalysts. It should be noted that the concentration of oxygen in the oxidizing gas is also adjusted according to the quantity of carbon and of hydrocarbon provided by the catalysts and by the fuel gas if necessary.

Preferably, the oxygenated oxidizing gas is injected in excess with respect to the combustion of the carbon and/or sulfur compounds which are released from the catalyst and the combustion of the gas optionally injected with the burner.

The spent catalyst to be treated is introduced into the furnace 1 via the supply pipe 11. The pipe 24 allows to recover the flue gases which are released from the furnace.

FIG. 2 shows the step of extraction of the slag 5 out of the furnace 1: the rotation of the furnace is stopped and the slag 5 is extracted by casting F2.

During this casting step, the extraction of most 5' of the slag 5 is carried out, while preserving a small fraction 5" of the supernatant slag above the cast iron melt 3.

FIG. 3 shows a conventional device of the rotary converter type, also known by the name Top Blown Rotary Converter (or TBRC). This device is known per se in the field of metallurgy.

The furnace 1 contains walls 15 of refractory material resisting very high temperatures. It can be driven in rotation about its axis of symmetry via a motor assembly 17 which drives the drive gear 21.

The motor assembly 17 comprises a motor 20 which drives in rotation an axis on which toothed wheels 19 which drive in rotation the notches rigidly connected to the shell of the converter.

A tread 14 allows to maintain the converter on its axis. The elements 22 and 26 respectively designate the static cone or cap that tops the converter, and a locking wheel. These elements are known per se.

The lower part of FIG. 3 below the cutting line AA shows the inner part of the furnace 1, which contains a mixture 4 of cast iron and of slag.

A burner 7 of the "oxygaz" type, supplied with an oxygenated oxidizing gas, the concentration of oxygen of which is adjusted according to the quantity of carbon and of hydrocarbon provided by the spent catalyst, allows to inject into the furnace 1 above the mixture 4 an excess of oxygenated oxidizing gas. The device also allows to simultaneously introduce a hydrocarbon fuel gas if needed. The spent catalyst to be treated is introduced into the furnace 1 via the supply pipe 11, jointly with flux compounds. The pipe 24 allows to recover the flue gases which are released from the furnace during its operation, which contain substantially the products coming from the combustion of the carbon and/or sulfur compounds which are released from the catalyst in contact with the slag and the liquid cast iron, and transport them to an assembly for treatment of the flue gases not shown. This assembly can comprise if necessary a chamber for post-combustion of the flue gases, as well as a chamber for recovering the sulfur, known per se.

The following examples are given as an illustration of the invention, and should not be interpreted in such a way as to limit the scope thereof.

EXAMPLES

Example 1: Treatment of a Raw Catalyst

The catalyst treated is a conventional spent catalyst containing nickel and molybdenum. This catalyst was treated in the raw state. Its composition (for 1 t of catalyst) is detailed in table 2 below:

TABLE 2

| Components | Quantity in kg (for 1 t of catalyst) |
|---|---|
| Hydrocarbons | 130 |
| Sulfur | 86 |
| Fixed carbon | 90 |
| Phosphorus | 3 |
| $Al_2O_3$ Alumina | 540 |
| Other oxides ($SiO_2$, $FeO_x$, . . .) | 18 |
| Nickel | 23 |
| Molybdenum | 110 |

To treat this catalyst, a furnace of the rotary converter type having a capacity of 10 tonnes was used.

This furnace contains 3 tonnes of a melt of cast iron having a composition similar to that given in table 3 below, and which results from the previous production sequence using the same spent catalyst.

The furnace was placed in rotation and the melt of cast iron was heated to 1500° C. which caused its melting.

A batch of approximately 30 tonnes of the above catalyst was progressively introduced (by continuous feeding of approximately 3 t/h) into the rotating furnace, at the same time as a flow rate of oxygen of 203 $Nm^3$ of oxygen per tonne of catalyst is injected via a burner above the cast iron melt, so as to allow the combustion of the compounds (hydrocarbons, CO, sulfur compounds) which are released from the catalyst during its melting in contact with the slag and the cast iron melt.

During this step, the slag which had formed at the surface of the cast iron melt was eliminated via castings carried out periodically at intervals of approximately one hour.

A cast iron melt enriched with metal, and the composition of which is described in detail in table 3 below, was recovered in the furnace:

TABLE 3

| Components | Quantity in kg |
|---|---|
| Fe | 120 |
| Ni | 21.6 |
| Mo | 99 |
| C | 10 |
| P | 0.6 |
| S | 1.3 |
| Total | 252.5 |

Moreover, the slag recovered has the composition described in detail in table 4 below:

TABLE 4

| Components | Quantity in kg |
|---|---|
| $Al_2O_3$ | 540 |
| CaO | 370 |
| CaS | 143 |
| $SiO_2$ | 10 |
| MgO | 120 |
| $MoO_3$ | 9 |
| FeO | 9 |
| $P_2O_5$ | 7.5 |
| Total | 1208.5 |

The concentration of sulfur in the metal melt (0.51% by weight) can be lowered to a target value of 0.1% by weight by an operation of conventional desulfurization carried out in the converter by treating the cast iron melt by means of 200 kg of a desulfurizing mixture containing CaO lime. This treatment also allows to lower the phosphorus concentration of the metal melt to 0.1% by weight. These operations as well as the desulfurizing and dephosphorizing agents are those implemented in a conventional manner in the field of iron metallurgy.

In this example, the energy provided by combustion of the compounds which are released from the catalyst in contact with the slag and the liquid cast iron (hydrocarbons, inorganic carbon and sulfur compounds) allowed to entirely cover the metallurgical needs and the thermal losses of the furnace during step b) of the method.

The energy balance of step b) is the following, expressed for one tonne of catalyst:

Energy input induced by the combustion of the compounds: 2029 kWh Energy needs of the furnace:

Melting of the metals: 96 kWh

Melting of the slag: 67 0 kWh

Balance of the endothermic and exothermic reactions (combustion of the hydrocarbons, of the fixed carbon, of the sulfur, reduction of the metal oxides): −193 kWh Thermal losses at the walls of the reactor: 400 kWh Energy losses by the flue gases: 1056 kWh.

Total of the needs: 2029 kWh

Example 2: Treatment of a Deoiled Catalyst

Example 1 was reproduced, by using a conventional spent catalyst containing nickel, molybdenum and vanadium. This catalyst was treated in the deoiled state, that is to say after having undergone an operation of stripping via water vapor. Its composition (for 1 t of catalyst) is described in detail in table 5 below:

TABLE 5

| Components | Quantity in kg (for 1 t of catalyst) |
|---|---|
| Hydrocarbons | 0 |
| Sulfur | 110 |
| Inorganic carbon | 100 |
| Phosphorus | 37 |
| $Al_2O_3$ Alumina | 433 |
| Other oxides ($SiO_2$, $FeO_x$, . . .) | 131 |
| Nickel | 38 |
| Molybdenum | 37 |
| Vanadium | 114 |

This catalyst was treated in the same a furnace of the rotary converter type as that used in example 1, having a capacity of 10 tonnes.

This furnace contains 3 tonnes of a melt of cast iron having a composition close to that given in table 6 below, and which results from the previous production sequence using the same spent catalyst.

The furnace was placed in rotation and the cast iron melt was heated to 1500° C. which caused its melting.

A batch of approximately 20 tonnes of the above catalyst was progressively introduced (by continuous feeding of approximately 3 t/h) into the rotating furnace, at the same time as a flow rate of oxygen of 114 $Nm^3$ of oxygen per tonne of catalyst is injected via a burner above the cast iron melt, so as to allow the combustion of the compounds (hydrocarbons, CO, sulfur compounds) which are released from the catalyst during its melting in contact with the slag and the cast iron melt.

Moreover, a fuel gas consisting of 50 $Nm^3$ of natural gas was added jointly with 100 $Nm^3$ of pure oxygen as an oxidizer by an "oxygaz" burner.

At regular time intervals of approximately one hour, the slag which had formed at the surface of the cast iron melt was eliminated by casting.

A cast iron melt enriched with metal, and the composition of which is described in detail in table 6 below, was recovered in the furnace.

TABLE 6

| Components | Quantity in kg |
|---|---|
| Fe | 204 |
| Ni | 35.7 |
| Mo | 33.6 |
| V | 3.4 |
| C | 12.4 |
| P | 2.8 |
| S | 3.3 |
| Total | 295 |

A slag, the composition of which is described in detail in table 7 below, is also obtained.

TABLE 7

| Components | Quantity in kg |
|---|---|
| $Al_2O_3$ | 433 |
| CaO | 284 |
| CaS | 116 |
| $SiO_2$ | 7 |
| MgO | 0 |
| $MoO_3$ | 6 |
| $V_2O_5$ | 197 |
| FeO | 15 |
| $P_2O_5$ | 2 |
| Total | 1060 |

The sulfur concentration of the metal melt (1.1% by weight) can be lowered to a target value of 0.1% by weight by an operation of conventional desulfurization carried out—optionally in several steps—in the converter, by treating the cast iron melt by means of a desulfurizing mixture containing lime (CaO).

The phosphorus concentration of the metal melt (0.9% by weight) can then be lowered to a target value of 0.1% by weight by a conventional dephosphorization operation carried out in the converter by treating the cast iron melt by means of a mixture containing lime, iron oxide and oxygen.

In this example, the energy provided by combustion of the compounds which are released from the catalyst in contact with the liquid cast iron (inorganic carbon and sulfur compounds) allows to cover most (72%) of the metallurgical needs and of the thermal losses of the furnace during step b) of the method.

The energy balance during step b) is the following:
Energy input induced by the combustion of the compounds: 1298 kWh
Energy needs of the furnace:
Melting of the metals: 111 kWh
Melting of the slag: 611 kWh
Exothermic and endothermic reactions (combustion of the hydrocarbons, of the fixed carbon, of the sulfur, reduction of the metal oxides): −116 kWh
Thermal losses at the walls of the reactor: 400 kWh
Energy losses by the flue gases: 792 kWh.
Total of the needs: 1798 kWh To balance the energy balance, as indicated above it was necessary to provide 500 kWh, in the form of a fuel gas consisting of 50 Nm³ of natural gas, added jointly with 100 Nm3 of pure oxygen as an oxidizer by an "oxygaz" burner.

The invention claimed is:

1. A method for treating a spent catalyst containing at least one refractory mineral oxide, one or more metals in the form of sulfide(s) chosen from the following metals: molybdenum, nickel, cobalt, tungsten, vanadium, as well as carbon compounds, this method comprising the following successive steps:
   a) in a smelting furnace of a rotary converter type, preparing a melt of cast iron in the melted state above which there is a layer of slag; then
   b) introducing into the furnace said spent catalyst and placing it in contact with the slag and the melt of cast iron in the melted state, while maintaining the furnace in rotation and while injecting an oxidizing gas containing oxygen into the furnace, above the mixture of catalyst, slag and cast iron, in such a way as to cause the combustion of the carbon and/or sulfur compounds which are released from the catalyst in contact with the slag and the liquid cast iron; then
   c) extracting from the furnace by sequential castings the slag formed in step b) in such a way as to on the one hand recover in the furnace a cast iron melt enriched with metal or metals, and on the other hand recover a slag containing the components of the catalyst other than metals, with the exception of vanadium which, when the spent catalyst contains vanadium, ends up in the slag.

2. The method according to the previous claim, characterized in that the cast iron melt is brought in step a) to a temperature comprised in the range from 1400° C. to 1650° C.

3. The method according to claim 1, characterized in that materials called "fluxes" chosen from lime, iron oxide, sodium carbonate, and calcium fluoride are also introduced into the furnace during step b).

4. The method according to claim 1, characterized in that a hydrocarbon fuel gas is also injected into the furnace during step b).

5. The method according to claim 4, characterized in that the fuel gas comprises light hydrocarbons, such as hydrocarbons comprising from 1 to 4 carbon atoms.

6. The method according to claim 1, characterized in that the injection of oxidizing gas is carried out in step b) via one or more injector(s), the axis of which is substantially parallel to the melt of metal and of slag, and with a moderate injection pressure in such a way as to create a low-thrust jet not penetrating the melt of metal and of slag.

7. The method according to claim 1, characterized in that the spent catalyst contains at least one of the following metal associations: CoMo, NiMo, NiCoMo, NiMoV, NiMoWCo, FeCeMoK, NiW.

8. The method according to claim 1, characterized in that the spent catalyst further contains vanadium.

9. The method according to claim 8, characterized in that the slag obtained in step c) is transferred into a second furnace in which it is treated to extract the vanadium therefrom.

10. The method according to claim 1, characterized in that the spent catalyst introduced in step b) is in the raw state, and has not undergone any previous treatment.

11. The method according to claim 10, characterized in that the catalyst contains hydrocarbons, at a concentration comprised in the range from 5% to 20% by weight, relative to the total weight of the spent catalyst.

12. The method according to claim 1, characterized in that the spent catalyst introduced in step b) is in a deoiled state under the action of the temperature and of a flow of gas.

13. The method according to claim 12, characterized in that the concentration of hydrocarbons in the catalyst is comprised in the range from 0.1% to 5% by weight, relative to the total weight of the spent catalyst.

14. The method according to claim 1, characterized in that the spent catalyst contains fixed carbon at a concentration comprised in the range from 5% to 20% by weight, relative to the total weight of the spent catalyst.

15. The method according to claim 1, characterized in that the cast iron melt is brought in step a) to a temperature comprised in the range from 1450° C. to 1550° C.

16. The method according to claim 5, characterized in that the fuel gas is natural gas.

17. The method according to claim 9, characterized in that the second furnace is a furnace of a rotary converter type.

18. The method according to claim 10, characterized in that the catalyst contains hydrocarbons, at a concentration comprised in the range from 10% to 20% by weight, relative to the total weight of the spent catalyst.

19. The method according to claim 1, characterized in that the spent catalyst introduced in step b) is in a deoiled state under the action of the temperature and of a flow of gas chosen from nitrogen, water vapor and air.

20. The method according to claim 1, characterized in that the spent catalyst contains fixed carbon at a concentration comprised in the range from 10% to 20% by weight, relative to the total weight of the spent catalyst.

* * * * *